US012691504B2

(12) United States Patent
Matlik

(10) Patent No.: US 12,691,504 B2
(45) Date of Patent: Jul. 28, 2026

(54) CLAMPING DEVICE FOR TOOL HOLDER

(71) Applicant: AB SANDVIK COROMANT,
Sandviken (SE)

(72) Inventor: Gunnar Matlik, Sandviken (SE)

(73) Assignee: AB Sandvik Coromant, Sandviken
(SE)

( * ) Notice: Subject to any disclaimer, the term of this
patent is extended or adjusted under 35
U.S.C. 154(b) by 405 days.

(21) Appl. No.: 18/572,881

(22) PCT Filed: Mar. 30, 2022

(86) PCT No.: PCT/EP2022/058420
§ 371 (c)(1),
(2) Date: Dec. 21, 2023

(87) PCT Pub. No.: WO2022/268372
PCT Pub. Date: Dec. 29, 2022

(65) Prior Publication Data
US 2024/0293873 A1     Sep. 5, 2024

(30) Foreign Application Priority Data

Jun. 23, 2021    (EP) ..................................... 21181281

(51) Int. Cl.
*B23B 31/26*          (2006.01)
*B23B 31/30*          (2006.01)

(52) U.S. Cl.
CPC .......... *B23B 31/265* (2013.01); *B23B 31/261*
(2013.01); *B23B 31/302* (2013.01);
(Continued)

(58) Field of Classification Search
CPC ... B23B 31/261; B23B 31/265; B23B 31/302;
B23B 2231/12; B23B 2260/034; B23B
2260/146; Y10T 409/309464
(Continued)

(56) References Cited

U.S. PATENT DOCUMENTS 6,193,451 B1 *   2/2001   Asberg .................. B23B 31/261
408/239 R
2022/0347764 A1 *  11/2022   Matlik .................. B23B 31/265
(Continued)

FOREIGN PATENT DOCUMENTS

EP        1060819 A2    12/2000
EP        3825046 A1    5/2021
(Continued)

*Primary Examiner* — Sunil K Singh
*Assistant Examiner* — Michael Vitale
(74) *Attorney, Agent, or Firm* — Corinne R. Gorski

(57) ABSTRACT

A clamping device is arranged for releasably holding a tool
holder shank. The clamping device includes a housing, a
drawbar axially moveable in a bore in the housing in a first
axial direction between an advanced releasing position and
a retracted locking position, engagement members moveable
under the effect of the drawbar into locking engagement with
the tool holder shank, a sleeve-shaped actuating member
surrounding a part of the drawbar and axially moveable in
relation to it, a piston received in the bore and fixed to the
actuating member, and a wedge arranged on the outside of
the drawbar and configured to move the drawbar rearwards
in the bore when pressed inwards towards a longitudinal
center axis of the drawbar by movement of the piston and the
actuating member in the first axial direction.

15 Claims, 7 Drawing Sheets

(52) U.S. Cl.
CPC .................... *B23B 2260/034* (2013.01); *Y10T*
*409/309464* (2015.01)

(58) Field of Classification Search
USPC ......................................................... 409/233
See application file for complete search history.

(56) References Cited

U.S. PATENT DOCUMENTS

| | | | | |
|---|---|---|---|---|
| 2023/0001493 A1* | 1/2023 | Matlik | .................. | B23B 31/265 |
| 2023/0146914 A1* | 5/2023 | Wasterlund | ........... | B23B 31/265 |
| | | | | 279/66 |
| 2023/0271261 A1* | 8/2023 | Matlik | .................. | B23B 31/261 |
| | | | | 279/4.02 |
| 2024/0278334 A1* | 8/2024 | Matlik | .................. | B23B 31/261 |
| 2024/0293873 A1* | 9/2024 | Matlik | .................. | B23B 31/261 |

FOREIGN PATENT DOCUMENTS

| | | | | | |
|---|---|---|---|---|---|
| EP | 3825047 A1 * | 5/2021 | ........... | B23B 31/302 |
| EP | 3838458 A1 * | 6/2021 | ........... | B23B 31/265 |
| EP | 3865235 A1 * | 8/2021 | ........... | B23B 31/302 |

* cited by examiner

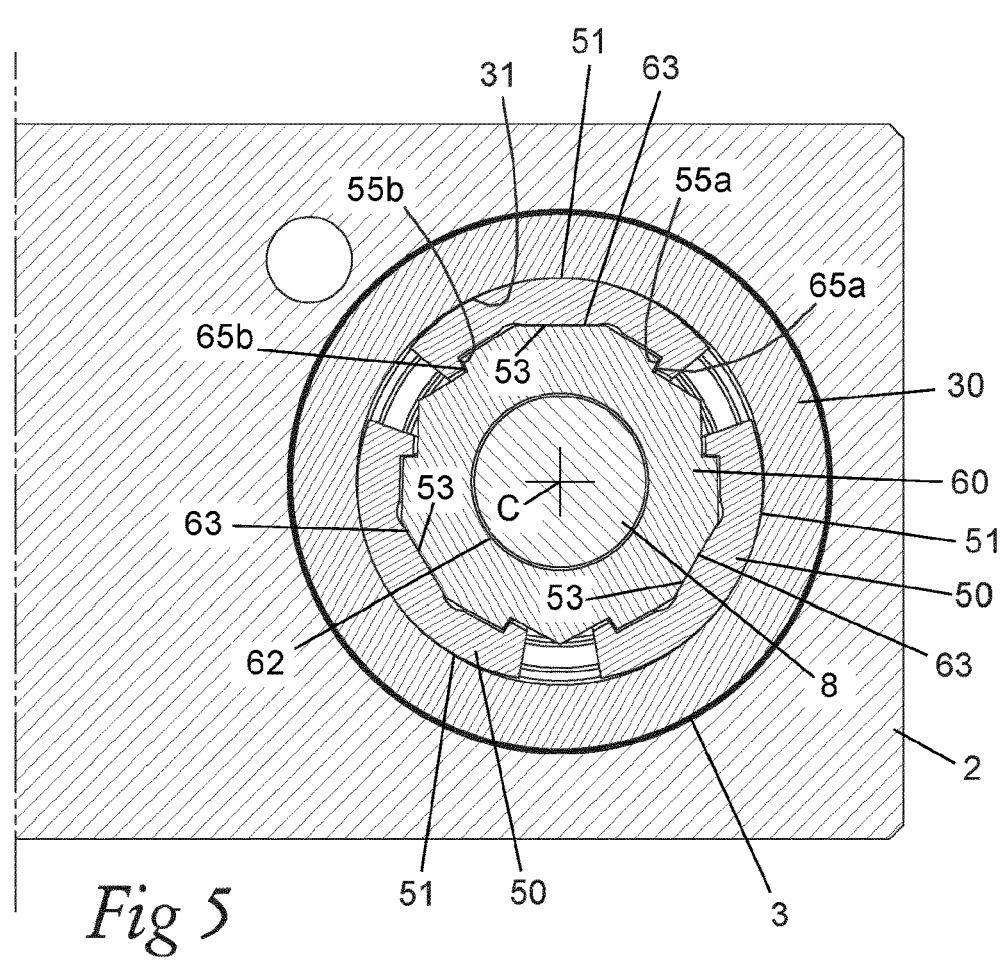
*Fig 5*
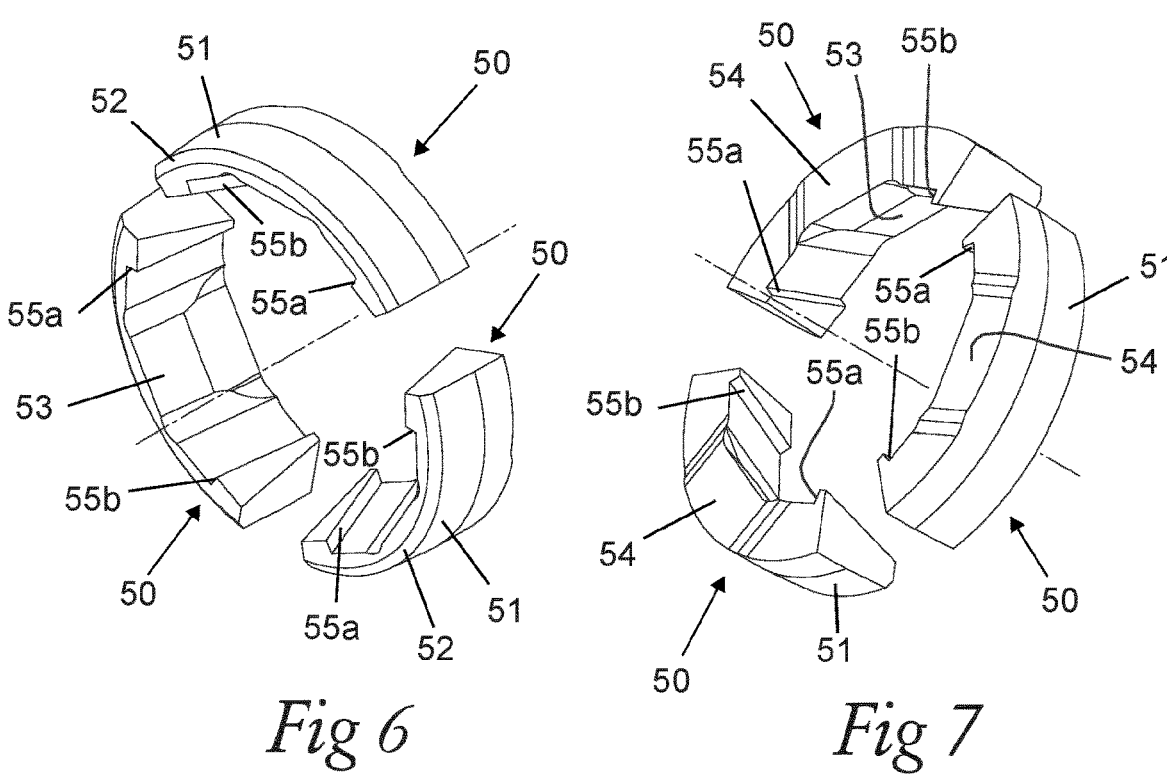
*Fig 6*          *Fig 7*

CLAMPING DEVICE FOR TOOL HOLDER

RELATED APPLICATION DATA

This application is a § 371 National Stage Application of PCT International Application No. PCT/EP2022/058420 filed Mar. 30, 2022 with priority to EP 21181281.3 filed Jun. 23, 2021.

FIELD OF THE INVENTION AND PRIOR ART

The present invention relates to a clamping device, which is intended to be used for connecting a tool holder to a machine tool.

Within the field of machine tools for metal cutting, a cutting tool, for instance in the form of a lathe tool, used for machining work pieces of metallic material is often fixed to a tool holder, which in its turn may be detachably fixed to a clamping device that is mounted to a machine tool. It is previously known to clamp a shank of such a tool holder to the housing of a clamping device by means of a clamping mechanism arranged in the housing. When the cutting tool needs to be exchanged, the tool holder is released from the housing of the clamping device and a new tool holder with another cutting tool is clamped to the housing. A clamping device of this type may for instance be detachably fixed at the periphery of a tool turret included in a machine tool.

Many previously known clamping devices of the above-mentioned type require manual operation in order to effect clamping or releasing of a tool holder. There also exist clamping devices adapted for automatic tool changing operations, where for instance a hydraulic piston is used for controlling the state of the clamping mechanism.

A hydraulically operated clamping device is previously known from EP 1 060 819 A2. This clamping device comprises a drawbar and a piston slidably mounted inside a bore in a housing, wherein an actuating member is fixed to the piston and slidably received in an axially extending recess at the rear end of the drawbar. A retraction of the actuating member in relation to the drawbar is transferred by means of a number of wedges into a movement of the drawbar into a retracted locking position, in which a tool holder is clamped to the housing. In the clamping device according to EP 1 060 819 A2, the wedges are slidably received in a respective radially extending aperture in the drawbar, wherein the actuating member, when being moved rearwards inside the associated recess in the drawbar under the effect of the piston, is configured to press the wedges radially outwards in their apertures to thereby achieve a displacement of the drawbar into the retracted locking position.

OBJECT OF THE INVENTION

The object of the present invention is to provide a clamping device of the above-mentioned type that has a new and favourable design and that is suitable for use with a tool turret of a machine tool.

SUMMARY OF THE INVENTION

According to the invention, the object is achieved by means of a clamping device according to the present disclosure.

The clamping device according to the invention comprises:

a housing having a front end, a rear end and a bore which intersects the front end and extends rearwardly therefrom, wherein a mounting portion for receiving the tool holder shank is provided at a front end of the bore;

a drawbar slidably mounted inside the bore so as to be moveable in the bore along a longitudinal axis thereof in a first axial direction from an advanced releasing position to a retracted locking position and in an opposite second axial direction from the retracted locking position to the advanced releasing position;

engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion, to a second position, in which the engagement members are in locking engagement with the tool holder shank and keep it secured to the housing;

a hydraulically operated actuating member arranged in the bore, wherein the actuating member is axially moveable in relation to the drawbar;

at least one wedge arranged in the bore and configured to transfer an axial movement of the actuating member in the first axial direction in relation to the drawbar into a movement of the drawbar from the advanced releasing position to the retracted locking position; and a piston slidably mounted in a space inside the bore and configured to divide this space into a first hydraulic chamber on a first side of the piston and a second hydraulic chamber on an opposite second side of the piston, wherein the actuating member is fixed to the piston and moveable together with the piston in the first axial direction by feeding of hydraulic fluid into the first hydraulic chamber and in the second axial direction by feeding of hydraulic fluid into the second hydraulic chamber.

According to the invention, said at least one wedge is arranged on the outside of the drawbar and configured to press the drawbar towards the retracted locking position when it is pressed inwards towards a longitudinal centre axis of the drawbar, wherein the wedge comprises an outwardly facing first pressure receiving surface. The actuating member has the form of a sleeve and surrounds a part of the drawbar, wherein the actuating member on its inner side is provided with a first pressure applying surface which faces inwards for contacting the first pressure receiving surface on the wedge. Said pressure applying surface has a radial distance to the longitudinal axis that increases as seen in the first axial direction, wherein the first pressure applying surface is configured to press the wedge inwards towards the longitudinal centre axis of the drawbar by pressing against the first pressure receiving surface on the wedge when the actuating member is moved in the first axial direction. Thus, the drawbar is moveable from the advanced releasing position to the retracted locking position under the effect of the actuating member and the wedge by movement of the actuating member in the first axial direction. Since the first pressure applying surface of the actuating member has a radial distance to the longitudinal axis that increases in the first axial direction, a movement of the actuating member in the first axial direction will cause a pressure to be applied by the first pressure applying surface on the first pressure receiving surface on the wedge. This pressure will have a component in the radial direction such that the wedge is pressed radially inwards towards the centre axis of the drawbar. By having the wedge or wedges and the actuating member arranged on the outside of the drawbar and not in apertures or recesses in drawbar, the design of the drawbar is facilitated and it can be made very compact. The clamping device of the present invention can be made compact in axial direction and is therefore suitable for use in tool turrets. The housing included in the clamping device of the present invention is preferably designed as a non-rotatable housing, which implies that the clamping device is to be used for clamping tool holders provided with lathe tools or other types of non-rotating tools.

According to an embodiment of the invention, the clamping device comprises a support element which is arranged in the bore and fixed to the housing, wherein the support element is configured to support the wedge, and wherein the wedge comprises an inclined wedge surface, which faces towards the front end of the housing and which slidably abuts against an inclined slide surface on the support element facing towards the rear end of the housing. When the wedge is pressed radially inwards by the actuating member, the wedge will slide along the slide surface on the support element and force the drawbar to move towards the retracted locking position.

According to another embodiment of the invention, the wedge comprises a contact surface, which faces towards the rear end of the housing and which abuts against a shoulder on the drawbar facing towards the front end of the housing, wherein the wedge, when being pressed inwards towards the longitudinal centre axis of the drawbar under the effect of the actuating member, is configured to exert a pushing force on the drawbar by pressing against said shoulder via the contact surface. Thus, the wedge is configured to act on the drawbar through this contact surface. Said shoulder is with advantage provided on an annular part of the drawbar, which is fixed to an elongated main part of the drawbar at a rear end thereof and which projects radially from this main part.

According to another embodiment of the invention, the support element is provided with guiding means, which are configured to co-operate with corresponding guiding means on the wedge in order to keep the wedge correctly positioned on the support element while allowing the wedge to slide longitudinally along the associated slide surface on the support element. Thus, the guiding means will ensure that the wedge is maintained in a correct position in relation to the support element when the pressing force on the wedge from the actuating member is released.

According to another embodiment of the invention, the support element surrounds the drawbar, wherein the drawbar is slidably mounted to the support element and extends through a central opening in the support element. The support element may hereby form a sliding support for the drawbar and assist in keeping the drawbar centrally arranged in the bore of the housing.

According to another embodiment of the invention, the piston is configured to come into contact with a rear end of the drawbar and push the drawbar in the second axial direction under the effect of a hydraulic pressure generated in the second hydraulic chamber by feeding of hydraulic fluid into the second hydraulic chamber. The piston may consequently be used for pushing the drawbar in the second axial direction when the drawbar is to be moved from the retracted locking position to the advanced releasing position.

According to another embodiment of the invention, first pressure applying surface and the first pressure receiving surface are inclined in relation to the longitudinal axis by such an angle $\alpha$ that the wedge will keep the actuating member in a self-locking axial position in the bore when the drawbar has been forced into the retracted locking position under the effect of the actuating member and the wedge. Hereby, the actuating member is capable of keeping the drawbar in the retracted locking position without requiring any force from the piston, which implies that the piston only needs to exert a force in connection with a tool changing operation. In this case, the first pressure applying surface and the first pressure receiving surface both extend in the same direction when viewed in a longitudinal section through the housing. The angle $\alpha$ is chosen so as to be below a self-lock threshold angle, such that the actuating member attains a self-locking axial position in relation to the wedge when the drawbar has been displaced inside the bore into the retracted locking position. To obtain a self-locking axial position, the angle $\alpha$ should be sufficiently small, i.e. below the self-lock threshold angle. A self-locking axial position refers to an axial position in which the static frictional force between the first pressure receiving surface on the wedge and the first pressure applying surface on the actuating member is greater than the opposing force in the plane of friction that is caused by a force applied to the wedge in a radial direction perpendicular to the longitudinal axis. Hence, a self-locking axial position is obtained within an angular range that depends on the coefficient of friction between the first pressure receiving surface on the wedge and the first pressure applying surface on the actuating member. This coefficient of friction depends on various parameters, such as the materials used, coatings on the surfaces, use of lubricants, etc. Hence, the self-lock threshold angle is dependent on such parameters. A person skilled in the art will be able to identify the self-lock threshold angle that apply in each specific case by using common general knowledge and/or routine experiments, or at least predict or assess whether a certain angle is below such a self-lock threshold angle. In general, it is preferred to choose an angle $\alpha$ that is well below the self-lock threshold angle, to thereby ensure a self-locking configuration. A further benefit of using a small angle $\alpha$ is that a force-amplifying effect is achieved, owing to the fact that a small angle $\alpha$ implies that a relatively long axial displacement of the actuating member will result in a relatively short axial displacement of the drawbar. However, a too small angle $\alpha$ may be inefficient and not practically well-functioning. For example, a very small angle $\alpha$ may render it difficult to release the actuating member from the self-locking axial position. The angle $\alpha$ is with advantage between 2° and 10°. With an angle $\alpha$ within this range, a self-locking effect as well as an appropriate force-amplifying effect may be achieved.

Another embodiment of the invention is characterized in:

that the wedge comprises an outwardly facing second pressure receiving surface;

that the actuating member on its inner side is provided with a second pressure applying surface which faces inwards for contacting the second pressure receiving surface on the wedge, the second pressure applying surface having a radial distance to the longitudinal axis that increases as seen in said first axial direction;

that the second pressure applying surface and the second pressure receiving surface are inclined in relation to the longitudinal axis by an angle $\beta$ which is larger than the angle $\alpha$; and that the first and second pressure applying surfaces and the first and second pressure receiving surfaces are arranged consecutively on the actuating member and on the wedge, respectively, such that, upon a movement of the actuating member in the first axial direction, the second pressure applying surface is configured to slide and press against the second pressure receiving surface during a first phase of the movement and the first pressure applying surface is configured to slide and press against the first pressure receiving surface during a subsequent second phase of the movement.

Hereby, the drawbar may be quickly moved in axial direction during the initial phase of the clamping under the effect of the larger angle β. This initial clamping phase does not require much force. However, during the final phase of the clamping, a great force is required for displacing the drawbar a short distance. When the actual clamping occurs, i.e. when the engagement members assume the above-mentioned first position, the drawbar is moved in axial direction under the effect of the smaller angle α such that the axial movement of the drawbar will be small as compared to the axial movement of the actuating member, which results in a force-amplifying effect, also referred to as "power boost". The angle β is suitably between 10° and 75°, preferably between 35° and 65°, which provides an efficient initial axial movement of the drawbar. By using a steep angle β for the initial axial movement of the drawbar and a small angle α for the actual clamping, the actuating member (and thus the entire clamping device) can be made relatively short in the axial direction while still providing a self-locking clamping mechanism with a significant force-amplifying effect.

According to another embodiment of the invention, the first pressure applying surface and the first pressure receiving surface are curved as seen in a cross-sectional plane perpendicular to the longitudinal axis, which will facilitate the manufacturing of the actuating member. Also the second pressure applying surface and the second pressure receiving surface are with advantage curved as seen in a cross-sectional plane perpendicular to the longitudinal axis.

According to another embodiment of the invention, the clamping device comprises two or more, preferably three, such wedges spaced apart in the circumferential direction of the drawbar. The wedges are preferably evenly distributed in the circumferential direction of the drawbar. Hereby, a well-balanced clamping device with good force distribution is obtained.

Further advantageous features of the clamping device according to the present invention will appear from the description following below.

BRIEF DESCRIPTION OF THE DRAWINGS

With reference to the appended drawings, a specific description of embodiments of the invention cited as examples follows below. In the drawings:

FIG. 5 is a cross-section according to the line V-V in FIG. 4b, FIGS. 6 and 7 are perspective views from different directions of wedges included in the clamping device of FIG. 1.

DETAILED DESCRIPTION OF EMBODIMENTS OF THE INVENTION

Figure 1:
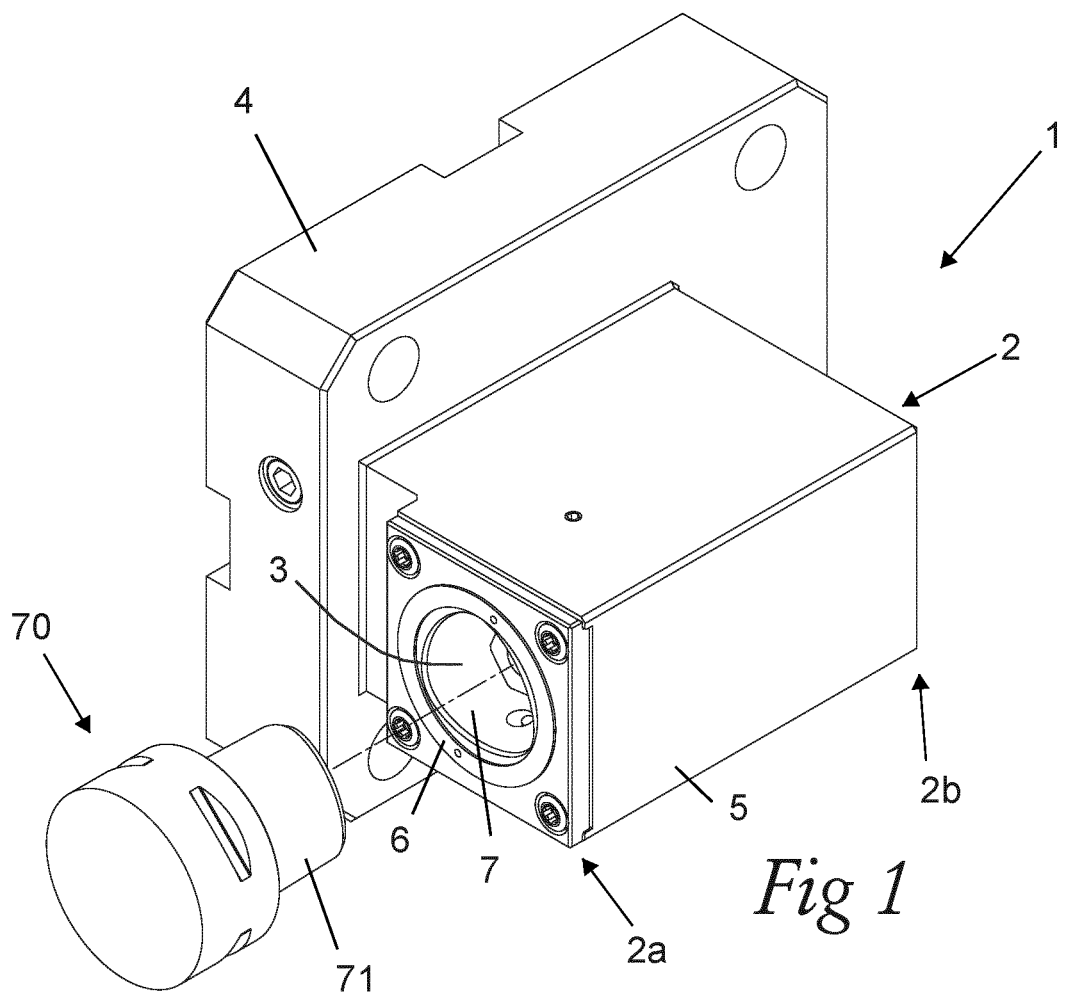
FIG. 1 is a perspective view of a clamping device according to an embodiment of the present invention and a tool holder, with the tool holder detached from the clamping device.

A clamping device 1 according to an embodiment of the present invention is illustrated in FIGS. 1-12. The clamping device 1 is configured to releasably clamp a tool holder 70 (very schematically illustrated in the drawings) to a housing 2 of the clamping device and enable the machining of a work piece by means of a cutting tool (not shown) fixed to the tool holder 70.

The housing 2 has a front end 2a, a rear end 2b and a bore 3 which intersects the front end 2a and extends rearwardly therefrom. Thus, the bore 3 has an entrance opening at the front end 2a of the housing. In the embodiment illustrated in FIG. 1, the housing 2 is fixed to a support 4 and connectable to a tool turret of a machine tool via this support 4.

Figures 2, 3:
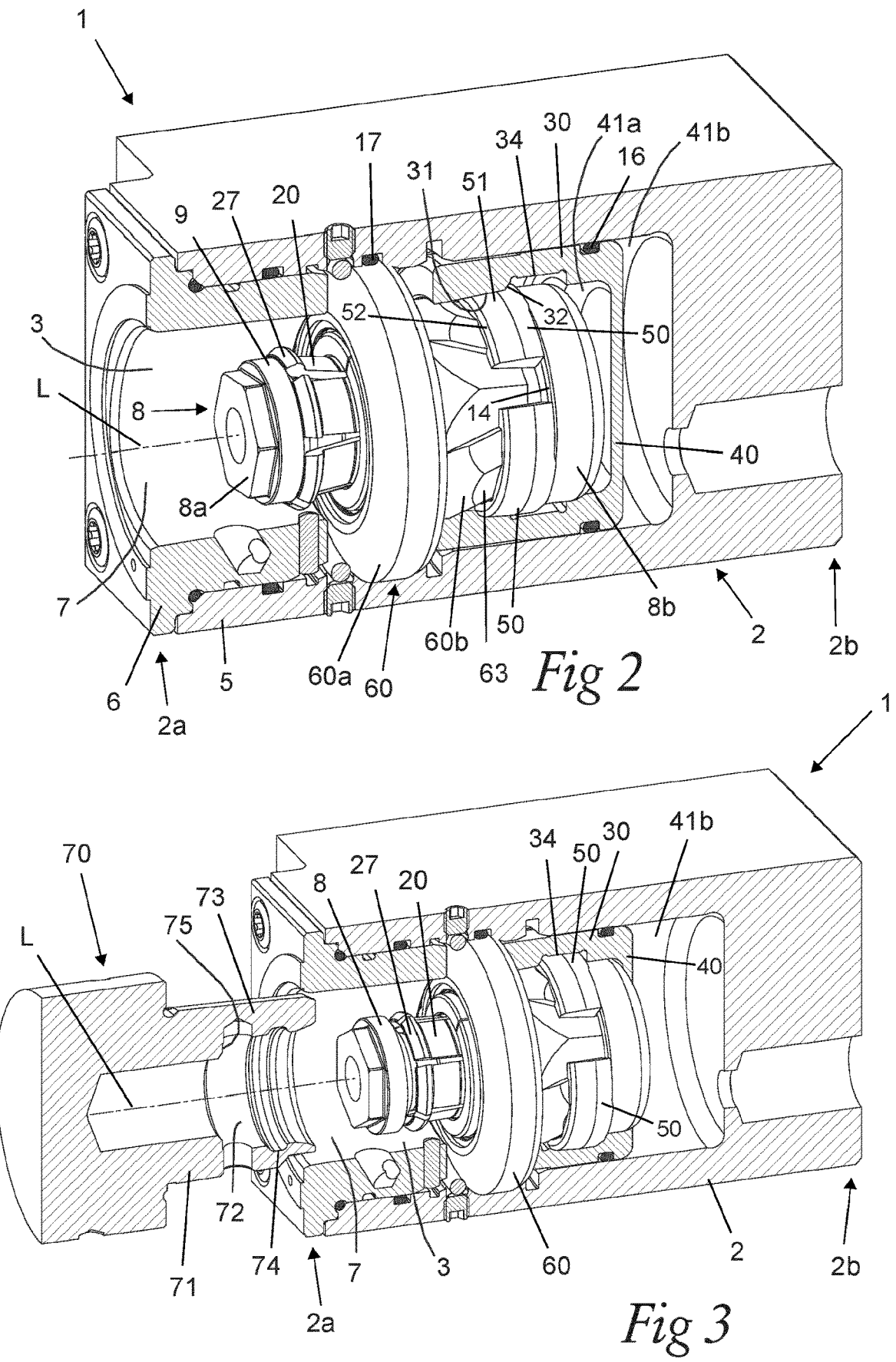
FIG. 2 is a partly cut perspective view of the clamping device of FIG. 1, with a drawbar of the clamping device in a retracted locking position.
FIG. 3 is a partly cut perspective view of the clamping device and tool holder of FIG. 1, with the drawbar in an advanced releasing position and with the tool holder detached from the clamping device.
Figures 4A, 4B:
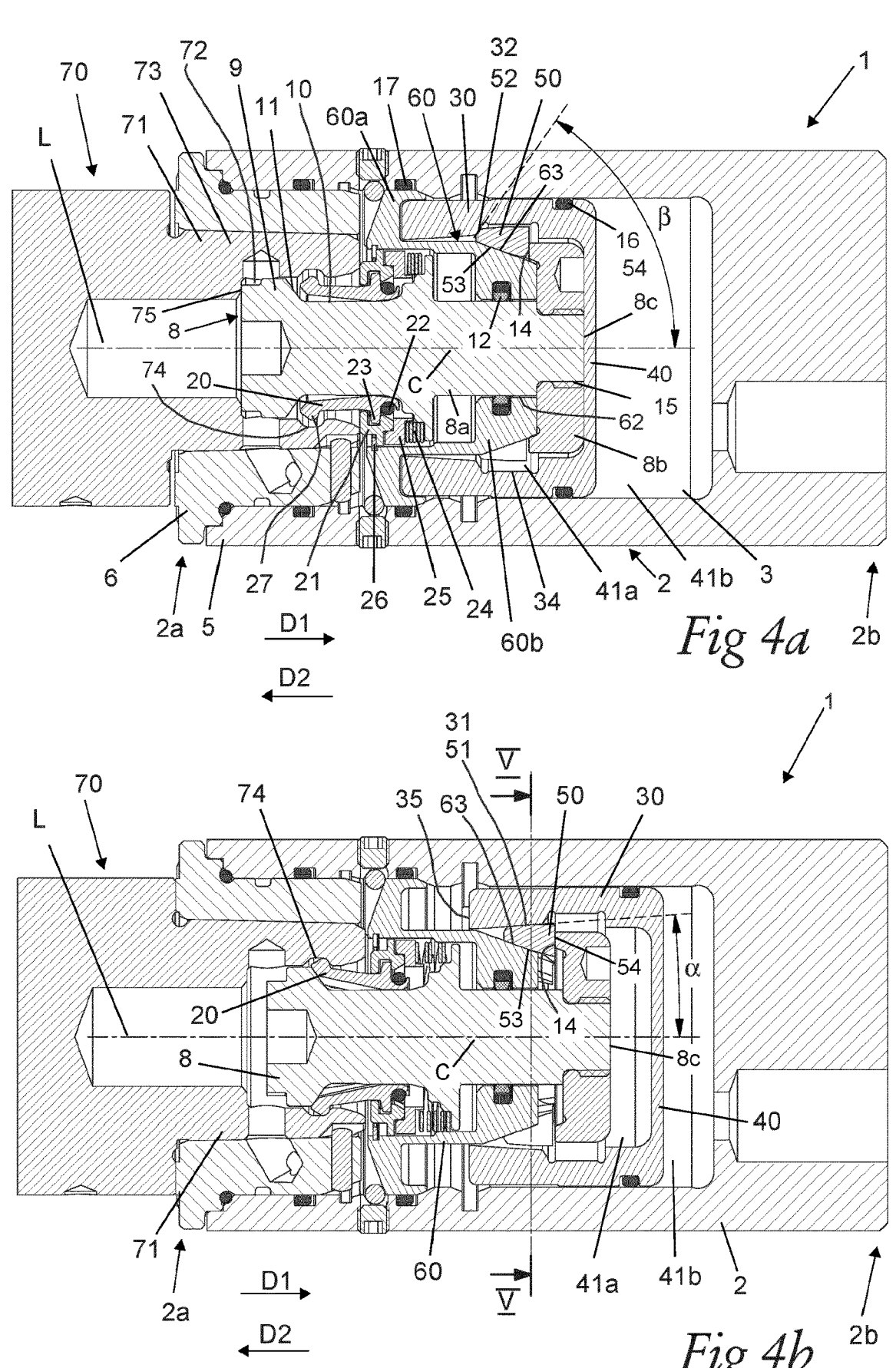
FIG. 4a is a longitudinal section through the clamping device and tool holder of FIG. 1, with the drawbar shown in the advanced releasing position.
FIG. 4b is a longitudinal section corresponding to FIG. 4a, with the drawbar shown in the retracted locking position.
Figures 8, 9, 10:
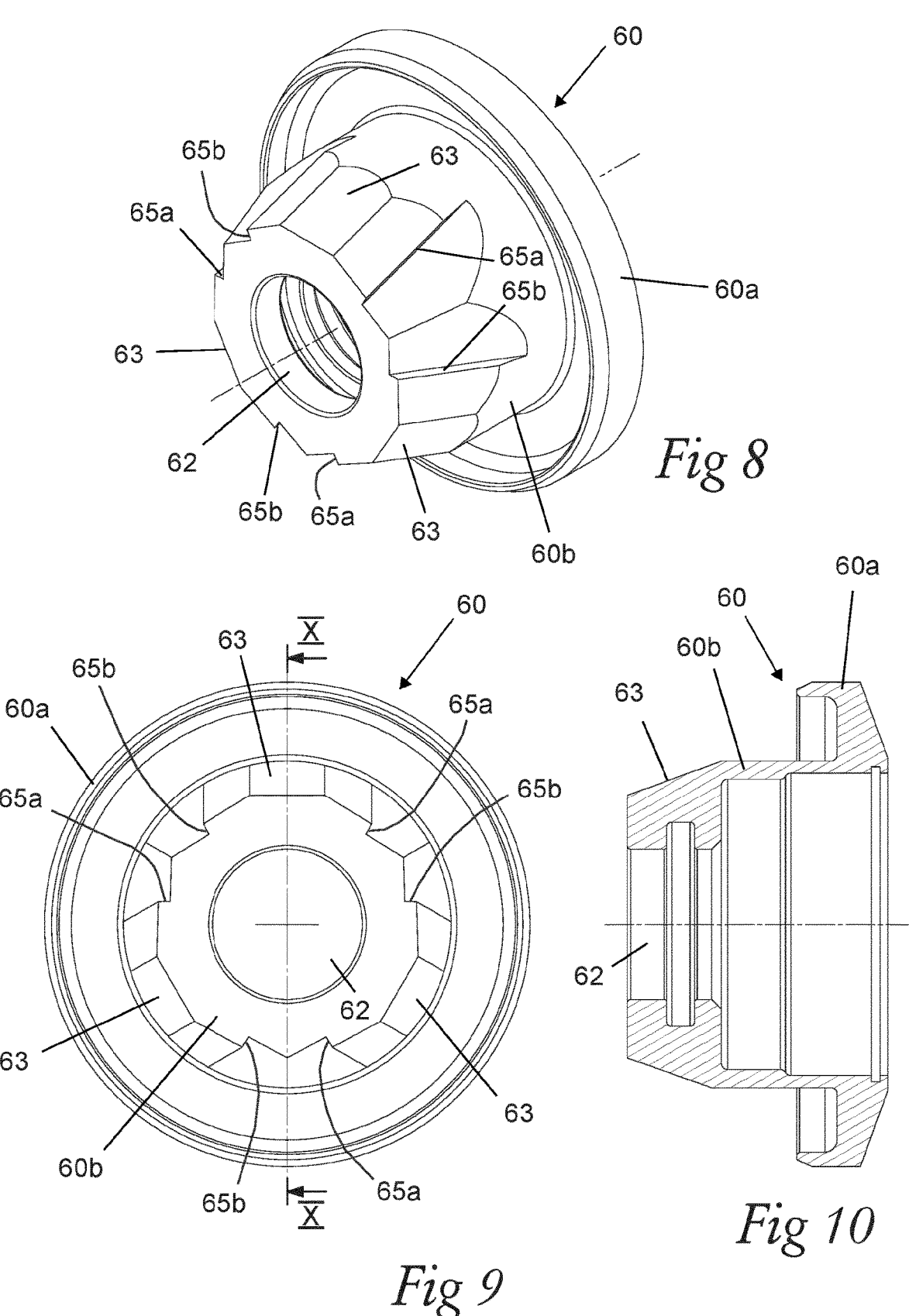
FIG. 8 is a perspective view of a support element included in the clamping device of FIG. 1.
FIG. 9 is a rear view of the support element of FIG. 8.
FIG. 10 is a cut according to the line X-X in FIG. 9.
Figure 11:
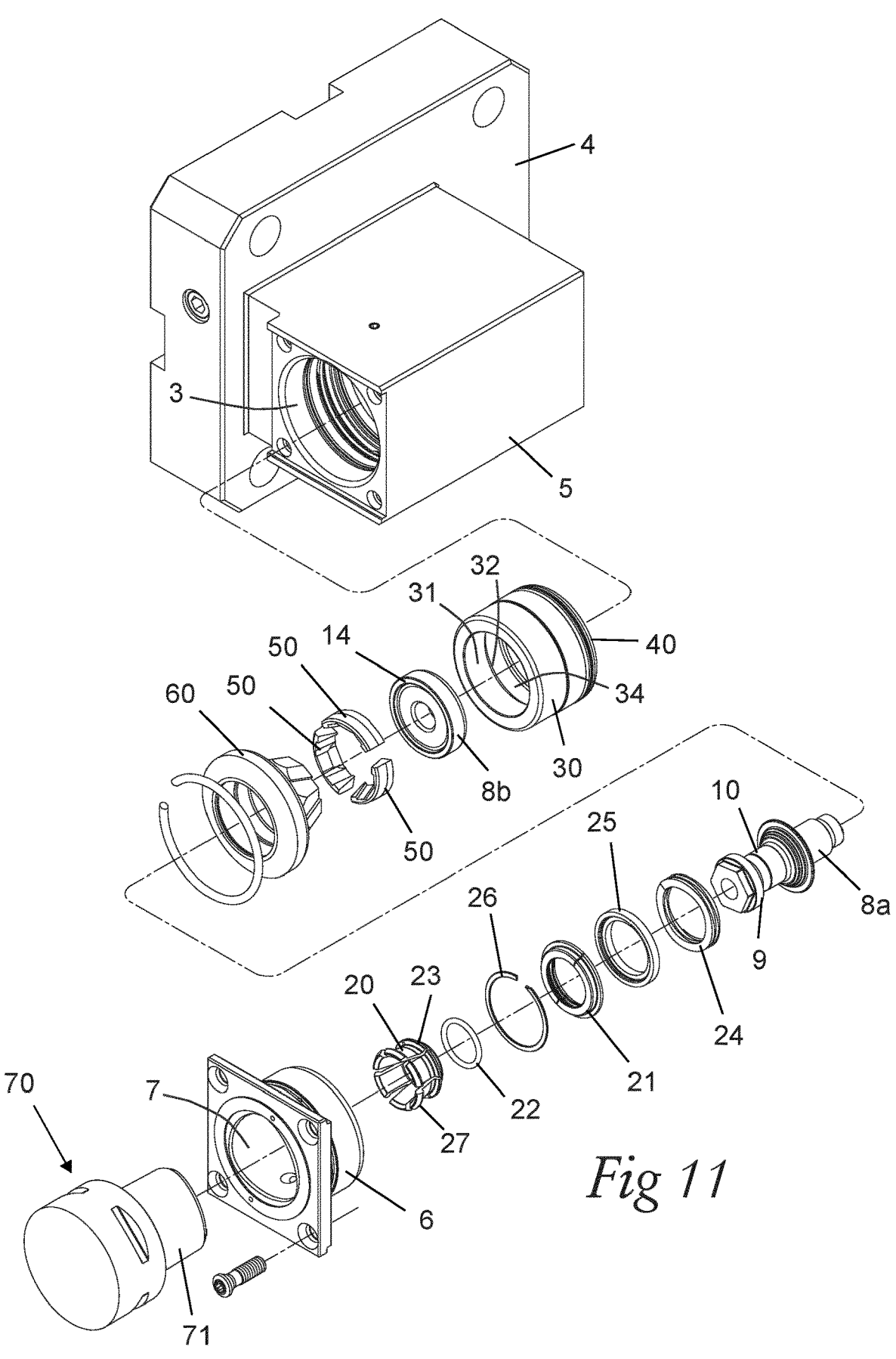
FIG. 11 is an exploded view of the clamping device and tool holder of FIG. 1.
Figure 12:
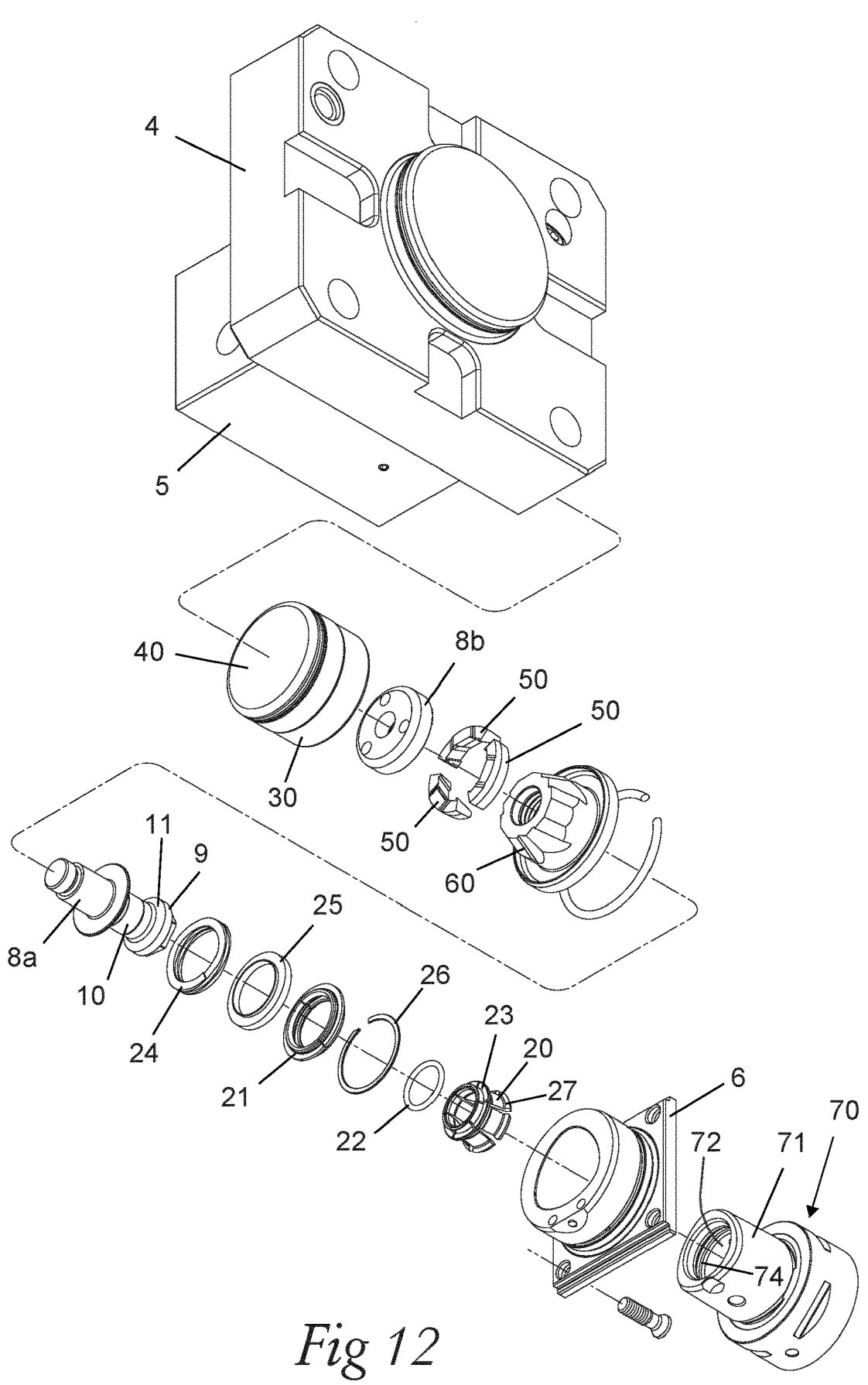
FIG. 12 is an exploded view from another direction of the clamping device and tool holder of FIG. 1.

A drawbar 8 is slidably mounted inside the bore 3 of the housing 2 so as to be reciprocally moveable in the bore 3 along a longitudinal axis L thereof between an advanced releasing position (see FIGS. 3 and 4a) and a retracted locking position (see FIGS. 2 and 4b). The drawbar 8 is moveable in relation to the housing 2 in a first axial direction D1 from the advanced releasing position to the retracted locking position and in an opposite second axial direction D2 from the retracted locking position to the advanced releasing position. The drawbar 8 has a front end facing the entrance opening of the bore 3 and an opposite rear end. A head portion 9 and a neck portion 10 are provided at the front end of the drawbar 8. The head portion 9 is located in front of the neck portion 10 as seen in the longitudinal direction of the drawbar, wherein the head portion 9 is connected to the neck portion 10 via a rearwardly facing bevelled surface 11 on the head portion 9.

A sleeve-shaped support element 60 is arranged in the bore 3 and surrounds the drawbar 8. The support element 60 is configured to support the drawbar 8 and is centrally arranged in the bore 3 with its centre axis coinciding with the longitudinal axis L of the bore. The drawbar 8 extends through a central opening 62 in the support element 60 and is slidably mounted to the support element 60 so as to be axially slidable in relation to the support element 60 along the longitudinal axis L of the bore 3. The support element 60 is fixed to the housing 2 so as to be prevented from moving in relation to the housing in the axial direction thereof. A sealing ring 12 is arranged between the drawbar 8 and an inner surface of the support element 60. In the illustrated example, this sealing ring 12 is received in a groove on the inner side of the support element 60.

In the illustrated example, the support element 60 is formed as a separate part that is mounted to the housing 2, but it may as an alternative be formed as an integrated part of the housing 2.

A mounting portion 7 for receiving a mounting shank 71 on the tool holder 70 is provided at a front end of the bore 3. This mounting shank 71 is here referred to as tool holder shank.

In the illustrated embodiment, the housing 2 comprises a base part 5 and an end piece 6 mounted to the base part 5 at the front end 2a of the housing. The end piece 6 has the form of a sleeve with an axial through hole that forms part of the above-mentioned bore 3. In this case, the above-mentioned mounting portion 7 is located in the through hole of the end piece 6. As an alternative, the part of the housing 2 accommodating the bore 3 could be formed in one piece without any end piece of the above-mentioned type.

The tool holder shank 71 is insertable into the mounting portion 7 of the bore 3 via the entrance opening at the front end 2a of the housing 2. The head portion 9 of the drawbar is received in an engagement bore 72 in the tool holder shank 71 and a tubular wall 73 of the tool holder shank is received in a space between the head portion 9 and an inner surface of the end piece 6. In the illustrated embodiments, the mounting portion 7 is conically shaped and has a somewhat "triangular" or polygonal, non-circular cross-sectional shape adapted to receive a similarly shaped tool holder shank 71. The conical shape ensures a connection free from play in the radial as well as the axial direction between the tool holder shank 71 and the housing 2, whereas the non-circular cross-section ensures a non-rotatable fixation of the tool holder shank 71 to the housing 2. However, the mounting portion 7 could also have any other suitable shape for receiving other types of tool holder shanks.

Engagement members 20 in the form of segments are arranged around the drawbar 8 at a front end thereof. Under the effect of a movement of the drawbar 8 from the advanced releasing position to the retracted locking position, the engagement members 20 are moveable from a first position (see FIG. 4a), in which the engagement members 20 allow the tool holder shank 71 to move into and out of the mounting portion 7 of the bore 3, to a second position (see FIG. 4b), in which the engagement members 20 are in locking engagement with an engagement groove 74 in the engagement bore 72 in the tool holder shank 71 and thereby keep the tool holder shank 71 secured to the housing 2.

In the illustrated embodiment, the engagement members 20 are arranged around the neck portion 10 of the drawbar 8 and held in place around the neck portion by means of a retainer ring 21 (see FIG. 4a) and an elastic O-ring 22, which are arranged in the bore 3 and surround the neck portion 10. Each engagement member 20 has an outwardly facing flange portion 23 engaged in an inner groove in the retainer ring 21. The O-ring 22 is received in an outwardly facing groove at the rear end of each engagement member 20. A compression spring 24, a thrust ring 25 and a stop ring 26 are also arranged in the bore 3 and configured to surround the drawbar 8. The compression spring 24 is mounted between a shoulder on the drawbar 8 and the thrust ring 25 and it is configured to urge the thrust ring 25, the retainer ring 21 and the engagement members 20 forwards. The forward movement of the retainer ring 21 towards the entrance opening of the bore 3 is limited by the stop ring 26, which is mounted in a groove in an inner surface of the support element 60. The retainer ring 21, the thrust ring 25 and the compression spring 24 are received in a space inside the support element 60, wherein the retainer ring 21 is in contact with an inner wall of the support element 60 and slidable in relation to this wall in the axial direction of the support element 60.

At its front end, each engagement member 20 is provided with an outwardly directed engagement flange 27, which is configured to be in engagement with the engagement groove 74 in the tool holder shank 71 when the engagement member 20 is in the above-mentioned second position. When the drawbar 8 is in the advanced releasing position, the front ends of the engagement members 20 are located behind the head portion 9 of the drawbar 8 and the engagement flanges 27 are out of engagement with the engagement groove 74 in the tool holder shank 71, as illustrated in FIG. 4a. When the drawbar 8 is moved axially rearwards in the bore 3 along the longitudinal axis L thereof, the bevelled surface 11 on the head portion 9 of the drawbar will come into contact with the front ends of the engagement members 20, wherein the front ends of the engagement members 20 will slide on this bevelled surface 11 and be pressed outwards so that the engagement flanges 27 on the engagement members come into engagement with the engagement groove 74 in the tool holder shank 71, whereupon the tool holder shank 71 will be pulled by the drawbar 8 into firm contact with inner surfaces of the spindle 2 within the mounting portion 7 of the bore 3.

The clamping device 1 further comprises a hydraulically operated actuating member 30, which is arranged in the bore 3 and axially moveable in relation to the drawbar 8. The actuating member 30 has the form of a sleeve and is configured to surround a part of the drawbar 8. The actuating member 30 is fixed to a piston 40 so as to be moveable in relation to the housing 2 together with the piston 40 along the longitudinal axis L of the bore 3. In the illustrated embodiment, the actuating member 30 and the piston 40 are formed in one piece. However, they may as an alternative be formed as separate parts, which are fixed to each other by means of a threaded joint or in any other suitable manner.

The piston 40 is slidably mounted in a space inside the bore 3 and configured to divide this space into a first hydraulic chamber 41a on a first side of the piston and a second hydraulic chamber 41b on an opposite second side of the piston. The actuating member 30 is moveable together with the piston 40 in the first axial direction D1 by feeding of hydraulic fluid into the first hydraulic chamber 41a and in the second axial direction D2 by feeding of hydraulic fluid into the second hydraulic chamber 41b. The actuating member 30 is received in the first hydraulic chamber 41a and when hydraulic fluid is fed into the first hydraulic chamber 41a, this hydraulic fluid will act on the piston 40 and also on an end surface 35 at a front end (see FIG. 4b) of the actuating member 30.

A sealing ring 16 is arranged between the piston 40 and the inner surface of the bore 3. This sealing ring 16 is received in a groove on the outer side of the piston 40.

The support element 60 comprises a front part 60a, through which the support element is fixed to the housing 2, and a rear part 60b, which is fixed to and supported by the front part 60a and extends into a space inside the actuating member 30. The front end of the actuating member 30 is received with play in an annular space formed between an inner surface of the bore 3 and the outer side of the rear part 60b of the support element 60. Hydraulic fluid is feedable into and dischargeable from the first hydraulic chamber 41a via a gap formed between the front part of the actuating member 30 and the outer side of the support element 60.

A sealing ring 17 is arranged between the front part 60a of the support element 60 and an inner surface of the bore 3. In the illustrated example, this sealing ring 17 is received in a groove in the inner surface of the bore 3.

One or more wedges 50 are arranged in the bore 3 and configured to transfer an axial movement of the actuating member 30 in relation to the drawbar 8 in the first axial direction D1 into a movement of the drawbar 8 from the advanced releasing position to the retracted locking position. The first axial direction D1 is a direction towards the rear end 2b of the housing 2 and the second axial direction D2 a direction towards the front end 2a of the housing 2. Thus, a movement of the drawbar 8 from the advanced releasing position to the retracted locking position is effected by an axial movement of the actuating member 30 rearwards along the drawbar 8.

In the illustrated embodiment, the clamping device 1 comprises three wedges 50, which are spaced apart in the circumferential direction of the drawbar 8. The wedges 50 are arranged on the outside of the drawbar 8 and are configured to jointly press the drawbar 8 towards the retracted locking position when they are pressed radially inwards towards a longitudinal centre axis C of the drawbar 8. In the illustrated embodiment, the longitudinal centre axis C of the drawbar 8 coincides with the longitudinal axis L of the bore 3. The clamping device 1 may comprise any suitable number of wedges 50. The wedges 50 are preferably evenly distributed in the circumferential direction of the drawbar 8.

The wedges 50 are fitted between the inner side of the actuating member 30 and the outer side of the rear part 60b of the support element 60. Each wedge 50 comprises an outwardly facing first pressure receiving surface 51, which faces away from the longitudinal axis L, and the actuating member 30 is on its inner side provided with a first pressure applying surface 31 which faces inwards for contacting the first pressure receiving surface 51 on each wedge. The first pressure applying surface 31 has a radial distance to the longitudinal axis L that increases as seen in the above-mentioned first axial direction D1. The first pressure applying surface 31 is configured to press the wedges 50 radially inwards towards the longitudinal centre axis C of the drawbar 8 by pressing against the first pressure receiving surfaces 51 on the wedges when the actuating member 30 is moved in the first axial direction D1.

In the illustrated embodiment, said first pressure applying surface 31 on the actuating member 30 has the form of an annular rotationally symmetric surface. In this case there is one single first pressure applying surface 31 on the actuating member 30. However, the actuating member 30 could as an alternative be provided with several separate first pressure applying surfaces 31 corresponding to the number of wedges 50, wherein the first pressure receiving surface 51 on each wedge 50 is associated with its own first pressure applying surface 31 on the actuating member 30.

Each wedge 50 also comprises an inclined wedge surface 53, which faces towards the front end 2a of the housing 2 and which slidably abuts against an inclined slide surface 63 on the support element 60 facing towards the rear end 2b of the housing. Each wedge 50 further comprises a contact surface 54, which faces towards the rear end 2b of the housing 2 and which abuts against a shoulder 14 on the drawbar 8 facing towards the front end 2a of the housing. In the illustrated embodiment, the contact surfaces 54 and the shoulder 14 extend in a cross-sectional plane perpendicular to the longitudinal axis L. When the wedges 50 are pressed radially inwards by the actuating member 30, each wedge 50 will slide downwards along the corresponding slide surface 63 on the support element and exert a pushing force on the drawbar 8 by pressing against the shoulder 14 on the drawbar via the contact surface 54 on the wedge and thereby force the drawbar 8 to move axially towards the retracted locking position.

In the illustrated embodiment, the wedge surface 53 of each wedge 50 and the associated slide surface 63 on the support element 60 are formed as planar surfaces which are inclined in relation to the longitudinal axis L as seen in a longitudinal section through the housing 2 perpendicular to the longitudinal axis L. In this case, these surfaces 53, 63 are linear as seen in a cross-sectional plane perpendicular to the longitudinal axis L, as illustrated in FIG. 5. The wedge surface 53 of each wedge and the associated slide surface 63 on the support element may as an alternative be curved as seen in a cross-sectional plane perpendicular to the longitudinal axis L. In the latter case, these surfaces 53, 63 are non-planar. As a further alternative, one of these surfaces 53, 63 could be curved as seen in a longitudinal section through the housing 2 perpendicular to the longitudinal axis L.

In the illustrated embodiment, the drawbar 8 is moveable in the second axial direction D2 from the retracted locking position to the advanced releasing position under the effect of the piston 40. In this case, the piston 40 is configured to come into contact with a rear end 8c of the drawbar 8 and push the drawbar in the second axial direction D2 under the effect of a hydraulic pressure generated in the second hydraulic chamber 41b by feeding of hydraulic fluid into the second hydraulic chamber.

In the illustrated embodiment, the support element 60 is provided with guiding means 65a, 65b, which are configured to co-operate with corresponding guiding means 55a, 55b on the wedges 50 in order to keep the wedges correctly positioned on the support element 60 while allowing each wedge 50 to slide longitudinally along the associated slide surface 63 on the support element 60. In the illustrated example, the guiding means on the support element 60 are formed as shoulders 65a, 65b extending in parallel with each slide surface 63 on either side thereof, whereas the guiding means on the wedges 50 are formed as corresponding shoulders 55a, 55b extending in parallel with the wedge surface 53 on each wedge on either side thereof. The shoulders 55a, 55b on each wedge 50 and the associated shoulders 65a, 65b on the support element 60 have such an inclination as seen in a cross-sectional plane perpendicular to the longitudinal axis L that the wedges 50 are allowed to move longitudinally along the respective slide surface 63 but prevented from moving in relation to the support element 60 in any other direction. The guiding means 55a, 55b, 65a, 65b on the wedges and on the support element could also be designed in any other suitable manner.

In the illustrated embodiment, the drawbar 8 comprises an elongated main part 8a and an annular part 8b, which is fixed to the main part 8a at a rear end thereof and which projects radially from the main part 8a, wherein said shoulder 14 is provided on the annular part 8b. The annular part 8b may be fixed to the main part 8a by means of a threaded joint 15 (see FIG. 4a) or in any other suitable manner. The drawbar 8 may of course also be designed in any other suitable manner.

The first pressure applying surface 31 and the first pressure receiving surfaces 51 are preferably inclined in relation to the longitudinal axis L by such an angle α (see FIG. 4b) that the wedges 50 will keep the actuating member 30 in a self-locking axial position on the support element 60 when the drawbar 8 has been forced into the retracted locking position under the effect of the actuating member 30 and the wedges 50. In the self-locking axial position, frictional forces between the actuating member 30 and the wedges 50 prevent the actuating member from being axially displaced in the second axial direction D2.

Each wedge 50 may also comprise an outwardly facing second pressure receiving surface 52, which faces away from the longitudinal axis L, wherein the actuating member 30 on its inner side is provided with a second pressure applying surface 32 which faces inwards for contacting the second pressure receiving surface 52 on each wedge. The second pressure applying surface 32 has a radial distance to the longitudinal axis L that increases as seen in the first axial direction D1. The second pressure applying surface 32 and the second pressure receiving surfaces 52 are inclined in relation to the longitudinal axis L by an angle β (see FIG. 4a) which is larger than the above-mentioned angle α. The first and second pressure applying surfaces 31, 32 and the first and second pressure receiving surfaces 51, 52 are arranged consecutively on the actuating member 30 and on each wedge 50, respectively, such that, upon a movement of the actuating member 30 in the first axial direction D1, the second pressure applying surface 32 is configured to slide and press against the associated second pressure receiving surfaces 52 during an initial first phase of the movement, whereupon the first pressure applying surface 31 is configured to slide and press against the associated first pressure receiving surfaces 51 during a subsequent second phase of the movement.

In the illustrated embodiment, said second pressure applying surface 32 on the actuating member 30 has the form of an annular rotationally symmetric surface. In this case there is one single second pressure applying surface 32 on the actuating member 30. However, the actuating member 30 could as an alternative be provided with several separate second pressure applying surfaces 32 corresponding to the number of wedges 50, wherein the second pressure receiving surface 52 on each wedge 50 is associated with its own second pressure applying surface 32 on the actuating member 30.

The first pressure applying surface 31 and the first pressure receiving surfaces 51 are with advantage curved as seen in a cross-sectional plane perpendicular to the longitudinal axis L, as illustrated in FIG. 5. Also the second pressure applying surfaces 32 and the second pressure receiving surfaces 52 may be curved as seen in a cross-sectional plane perpendicular to the longitudinal axis L. However, one or more of the pressure applying surfaces 31, 32, and pressure receiving surfaces 51, 52 may as an alternative have the form of planar surfaces and consequently be linear as seen in a cross-sectional plane perpendicular to the longitudinal axis L.

When a tool holder 70 is to be clamped to the housing 2, the tool holder shank 71 is inserted into the mounting portion 7 of the bore 3 with the drawbar 8 positioned in the advanced releasing position, as illustrated in FIG. 4a. Hereby, the head portion 9 of the drawbar is received in the engagement bore 72 in the tool holder shank 71 and the engagement groove 74 in the tool holder shank 71 is positioned on the outside of the engagement flanges 27 of the engagement members 20. Thereupon, hydraulic oil is fed into the first hydraulic chamber 41a in order to move the piston 40 in the first axial direction D1 and thereby achieve a corresponding axial movement of the actuating member 30 in the first axial direction D1. During a first phase of this axial movement of the actuating member 30, the second pressure applying surface 32 on the actuating member 30 will slide and press against the second pressure receiving surfaces 52 on the wedges 50. Hereby, the wedges 50 will be pressed radially inwards towards the longitudinal centre axis C of the drawbar 8 and axially rearwards in the first axial direction D1 against the shoulder 14 on the drawbar 8, which will cause an axial displacement of the drawbar 8 towards the retracted locking position. Due to the relatively steep inclination β of the second pressure applying and receiving surfaces 32, 52, the wedges 50 will initially move inwards rather fast, which results in a relatively quick displacement of the drawbar 8. The relatively steep angle β is advantageous since the initial displacement of the drawbar 8 does not require much force. The first and second pressure applying surfaces 31, 32 and the first and second pressure receiving surfaces 51, 52 are so arranged that when the actuating member 30 has been moved such a distance that the second pressure applying surface 32 has passed the second pressure receiving surface 52 and the first pressure applying surface 31 reaches the first pressure receiving surfaces 51, i.e. at the transition between these respective surfaces, the drawbar 8 has almost reached its final retracted position in the bore 3. Hence, for the final clamping phase, in which a large force is beneficial, the first pressure applying and receiving surfaces 31, 51 are active. In this phase, a relatively large movement of the actuating member 30 will result in a very small radial displacement of the wedges 50, and an even smaller axial displacement of the drawbar 8, which consequently will provide a force amplifying effect that will make it possible for the drawbar 8 to pull the tool holder shank 71 with a large force into firm engagement with the housing 2. Furthermore, the small inclination α of the first pressure applying and receiving surfaces 31, 51 will provide a self-locking effect and make sure that the clamping device will remain in the clamped state without requiring any additional locking means. Hereby, the hydraulic pressure in the first hydraulic chamber 41a may be released when the drawbar 8 has reached the retracted locking position.

When a tool changing operation is to be performed and the tool holder 70 is to be released from the housing 2, hydraulic oil is fed into the second hydraulic chamber 41b in order to move the piston 40 in the second axial direction D2 and thereby achieve a corresponding axial movement of the actuating member 30 in the second axial direction D2. When the actuating member 30 is subjected to a sufficient force in the second axial direction D2, the self-locking frictional engagement between the first pressure applying surfaces 31 on the actuating member 30 and the first pressure receiving surfaces 51 on the wedges 50 will be released, whereupon the actuating member 30 and the piston 40 are moveable in relation to the housing 2 and the support element 60 in the second axial direction D2. When the piston 40 is moved in this direction, the piston 40 will come into contact with the rear end 8c of the drawbar 8 and push the drawbar in the second axial direction D2 under the effect of the hydraulic pressure generated in the second hydraulic chamber 41b. When the drawbar 8 is moved towards the advanced releasing position, the outer end of the head portion 9 of the drawbar 8 will hit against a surface 75 in the engagement bore 72 in the tool holder shank 71 and thereby release the tool holder shank 71 from the housing 2. During the movement of the drawbar 8 towards the advanced releasing position, the shoulder 14 on the drawbar 8 is pressed against the corresponding contact surfaces 54 on the wedges 50 and will thereby force the wedges to slide upwards along the slide surfaces 63 on the support element 60. The wedges 50 are hereby pressed radially outwards into an annular recess 34 provided on the inner side of the actuating member 30 axially behind the second pressure applying surface 32. The guiding means 55a, 55b, 65a, 65b on the wedges 50 and on the support element 60 keep the wedges correctly positioned on the support element 60 when the wedges 50 are received in the annular recess 34 in the actuating member 30.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A clamping device arranged for releasably holding a tool holder shank, the clamping device comprising:

a housing having a front end, a rear end, and a bore which intersects the front end and extends rearwardly therefrom, wherein a mounting portion arranged for receiving the tool holder shank is provided at a front end of the bore;

a drawbar slidably mounted inside the bore so as to be moveable in the bore along a longitudinal axis thereof in a first axial direction from an advanced releasing position to a retracted locking position, and further moveable in an opposite second axial direction from the retracted locking position to the advanced releasing position;

engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion, to a second position, in which the engagement members are in locking engagement with the tool holder shank and keep the tool holder shank secured to the housing;

a hydraulically operated actuating member arranged in the bore, wherein the actuating member is axially moveable in relation to the drawbar;

at least one wedge arranged in the bore and configured to transfer an axial movement of the actuating member in the first axial direction in relation to the drawbar into a movement of the drawbar from the advanced releasing position to the retracted locking position; and a piston slidably mounted in a space inside the bore and configured to divide this space into a first hydraulic chamber on a first side of the piston and a second hydraulic chamber on an opposite second side of the piston, wherein the actuating member is fixed to the piston and moveable together with the piston in the first axial direction by feeding of hydraulic fluid into the first hydraulic chamber and in the second axial direction by feeding of hydraulic fluid into the second hydraulic chamber, wherein the at least one wedge is arranged on the outside of the drawbar and is configured to press the drawbar towards the retracted locking position when the at least one wedge is pressed inwards towards a longitudinal center axis of the drawbar, wherein the at least one wedge comprises includes an outwardly facing first pressure receiving surface, wherein the actuating member has a form of a sleeve and surrounds a part of the drawbar, wherein the actuating member on an inner side thereof is provided with a first pressure applying surface which faces inwards for contacting the first pressure receiving surface on the at least one wedge, the first pressure applying surface having a radial distance to the longitudinal axis that increases in the first axial direction; and wherein the first pressure applying surface is configured to press the at least one wedge inwards towards the longitudinal center axis of the drawbar by pressing against the first pressure receiving surface on the at least one wedge when the actuating member is moved in the first axial direction.

2. The clamping device according to claim 1, further comprising;

a support element which is arranged in the bore and is fixed to the housing, wherein the support element is configured to support the at least one wedge, and wherein the at least one wedge includes an inclined wedge surface, which faces towards the front end of the housing and which slidably abuts against an inclined slide surface on the support element facing towards the rear end of the housing.

3. The clamping device according to claim 2, wherein the at least one wedge includes a contact surface, which faces towards the rear end of the housing and which abuts against a shoulder on the drawbar facing towards the front end of the housing, wherein the at least one wedge, when being pressed inwards towards the longitudinal center axis of the drawbar under the effect of the actuating member, is configured to exert a pushing force on the drawbar by pressing against said shoulder via the contact surface.

4. The clamping device according to claim 3, wherein the drawbar includes an elongated main part and an annular part, which is fixed to the main part at a rear end thereof and which projects radially from the main part, wherein said shoulder is provided on the annular part.

5. The clamping device according to claim 2, wherein the support element is provided with guiding means, which are configured to co-operate with corresponding guiding means on the at least one wedge in order to keep the at least one wedge correctly positioned on the support element while allowing the at least one wedge to slide longitudinally along the associated slide surface on the support element.

6. The clamping device according to claim 2, wherein the support element surrounds the drawbar, and wherein the drawbar is slidably mounted to the support element and extends through a central opening in the support element.

7. The clamping device according to claim 1, wherein the piston is configured to come into contact with a rear end of the drawbar and to push the drawbar in the second axial direction under the effect of a hydraulic pressure generated in the second hydraulic chamber by feeding of the hydraulic fluid into the second hydraulic chamber.

8. The clamping device according to claim 1, wherein the first pressure applying surface and the first pressure receiving surface are curved as seen in a cross-sectional plane perpendicular to the longitudinal axis.

9. The clamping device according to claim 1, wherein the first pressure applying surface and the first pressure receiving surface are inclined in relation to the longitudinal axis by such an angle α that the at least one wedge keeps the actuating member in a self-locking axial position in the bore when the drawbar has been forced into the retracted locking position under the effect of the actuating member and the at least one wedge.

10. The clamping device according to claim 9, wherein the at least one wedge includes an outwardly facing second pressure receiving surface, wherein the actuating member on an inner side thereof is provided with a second pressure applying surface which faces inwards for contacting the second pressure receiving surface on the at least one wedge, the second pressure applying surface having a radial distance to the longitudinal axis that increases in said first axial direction, wherein the second pressure applying surface and the second pressure receiving surface are inclined in relation to the longitudinal axis by an angle ß which is larger than the angle α, and wherein the first and second pressure applying surfaces and the first and second pressure receiving surfaces are arranged consecutively on the actuating member and on the at least one wedge, respectively, such that, upon a movement of the actuating member in the first axial direction, the second pressure applying surface is configured to slide and to press against the second pressure receiving surface during a first phase of the movement and the first pressure applying surface is configured to slide and to press against the first pressure receiving surface during a subsequent second phase of the movement.

11. The clamping device according to claim 10, wherein the second pressure applying surface and the second pressure receiving surface are curved as seen in a cross-sectional plane perpendicular to the longitudinal axis.

12. The clamping device according to claim 1, wherein the at least one wedge includes two or more wedges spaced apart from one another in a circumferential direction of the drawbar.

13. The clamping device according to claim 12, wherein said two or more wedges are three in number.

14. The clamping device according to claim 12, wherein said two or more wedges are evenly distributed in the circumferential direction of the drawbar.

15. The clamping device according to claim 1, wherein the actuating member and the piston are formed in one piece.

* * * * *